United States Patent [19]

Derrien

[11] 4,382,880
[45] May 10, 1983

[54] PREPARATION OF MOLYBDENUM/TUNGSTEN MIXED OXIDE CATALYSTS

[75] Inventor: Jean-Yves Derrien, Bourg-la-Reine, France

[73] Assignee: Rhone-Poulenc Industries, Paris, France

[21] Appl. No.: 256,046

[22] Filed: Apr. 21, 1981

[30] Foreign Application Priority Data

Apr. 25, 1980 [FR] France .................. 80 09314

[51] Int. Cl.³ .............. B01J 23/82; B01J 23/84; B01J 23/86; B01J 23/88
[52] U.S. Cl. .................... 252/465; 252/470
[58] Field of Search .............. 252/465, 467, 470

[56] References Cited

U.S. PATENT DOCUMENTS 3,624,146 11/1971 Parthasarthy et al. ......... 252/470 X
4,148,757 4/1979 Brazdil et al. .................. 252/470 X
4,224,187 9/1980 Vanderspurt ....................... 252/470

*Primary Examiner*—W. J. Shine
*Attorney, Agent, or Firm*—Burns, Doane, Swecker & Mathis

[57] ABSTRACT

An active oxidation catalyst having the formula:

$$A_a Mo_c W_d B_b O_x$$

wherein A is at least one of the metals cobalt, nickel, manganese and/or lead; B is at least one of the metals iron, bismuth, chromium and/or thallium; a is the sum of each of the metals A and ranges from greater than zero to about 12; c and d each ranges from zero to 12, with their sum being about 12; b is the sum of each of the metals B and ranges from greater than zero to about $1.5[(c+d)-a]$; an x fulfills all unsatisfied valences, is prepared by (I) intimately admixing (i) a first aqueous solution comprising the ammonium salts of the molybdenum and/or tungsten, said ammonium salts being present therein in amounts such as to satisfy the formula parameters c and d, with (ii) a second aqueous solution comprising the salts of the A and/or B metals, at least one of said A and/or B salts being either a nitrate or a chloride and said salts being present therein in amounts such as to satisfy the formula parameters a and b, until a first solids fraction precipitates therefrom; (II) thereafter basicifying the resulting suspension with ammonia to a pH value in excess of the pH of said first aqueous solution, until a second solids fraction precipitates therefrom; (III) recovering said first and said second solids fractions, and drying the same; and (IV) thence calcining said dried solids fractions.

15 Claims, No Drawings

PREPARATION OF MOLYBDENUM/TUNGSTEN MIXED OXIDE CATALYSTS

BACKGROUND OF THE INVENTION

1. Field of the Invention

The present invention relates to the improved preparation of various catalysts, and, more especially, to the preparation of catalysts comprising the oxides of molybdenum and/or tungsten.

2. Description of the Prior Art

The subject catalysts are per se known to the prior art. They are used, in particular, for the preparation of $\alpha,\beta$-unsaturated aldehydes by the oxidation of olefins in the gaseous phase.

Thus, French Pat. No. 1,514,167 describes catalysts for the preparation of unsaturated aldehydes by the oxidation of olefins such as propylene and isopropylene either with air or oxygen, said catalysts having the general formula:

$$Ni_aCo_bFe_cBi_dAs_eP_fMo_gO_h$$

with a ranging from 0 to 20, b ranging from 0 to 20, (a+b) ranging from 0.5 to 20, c ranging from 0.5 to 8, d ranging from 0.1 to 7, e ranging from 0 to 3, f being less than 0.1, g being about 12, and h ranging from 36 to 98.

The aforesaid catalysts are prepared by adding an aqueous solution of suitable, water soluble salts of nickel, cobalt, iron and bismuth, a suitable arsenic compound and a suitable phosphorus compound, to an aqueous solution of a suitable molybdate, such as ammonium molybdate. The resulting paste is heated, on a support if desired, to evolve the water therefrom and to dry the cake which is formed.

The solid cake is then calcined at an elevated temperature, in air. The "suitable" water soluble salts noted in the aforementioned patent are nickel nitrate, cobalt nitrate, ferric nitrate and bismuth nitrate, for example.

And the French Pat. No. 1,604,942 features a process for the preparation of acrolein comprising the oxidation of propylene in gaseous phase, with a gas containing oxygen and water vapor, in the presence of a catalyst including the oxides of molybdenum, bismuth, iron and cobalt, the atomic content of which being as follows: Mo, 40.0 to 67.7%; Bi, 1.9 to 21.7%; Fe, 1.6 to 6.5% and Co, 21.0 to 48.1%.

The preparation of the catalysts described in this second patent consists of adding to a vigorously agitated aqueous solution of ammonium molybdate, an aqueous solution of the nitrates of iron, cobalt and bismuth. Subsequently, the water is eliminated and the resulting catalyst is calcined, optionally on suitable support.

Yet another process, described in published French application No. 2,147,933 (Ser. No. 72.20810), features the preparation of unsaturated carbonyl compounds from olefins. According to this particular process, the catalytic oxidation is effected in the presence of catalytic amounts of an oxide wherein the atomic ratios of the catalytic elements Co/Fe/Bi/W/Mo/Si/Tl/Z (Z=alkali or alkaline earth metals) are: 2.0 to 20.0/0.1 to 10.0/0.1 to 10.0/0.5 to 10.0/2.0 to 11.5/0.5 to 15.0/0.005 to 3.0/0 to 3.0, with the proviso that W+Mo is equal to 12.0.

These catalysts may be prepared by admixing aqueous solutions of ammonium molybdate and ammonium p-tungstate, adding to the mixture aqueous solutions of cobalt nitrate, ferric nitrate, bismuth nitrate, and thallium nitrate, together with an aqueous solution of a hydroxide or nitrate of either an alkali or an alkaline earth metal. The water is then evaporated therefrom and the resultant product calcined, optionally on a support.

It is also known to the prior art, from published French application No. 2,364,061 (Ser. No. 76.27531) to prepare a catalyst comprising the oxides of cobalt, molybdenum, bismuth and iron, and having the formula $Co_aM_{12}Fe_bBi_cO_x$, with a ranging from 8 to 10, b ranging from 0.5 to 2, c ranging from 0.5 to 2 and x satisfying the various valences, whereby the active phase includes that phase corresponding to the formula $Bi_2Mo_2Fe_2O_{12}$. Such catalysts result in markedly improved yields, for example, in the oxidation of olefins to $\alpha,\beta$-unsaturated aldehydes.

These catalysts are prepared, moreover, by interreacting an aqueous solution of ammonium heptamolybdate with an aqueous solution of Co, Bi and Fe nitrates. The water is then evaporated and the resulting paste dried. The solids obtained are subjected, optionally after a precalcination at approximately 450° C., to a first calcination at a temperature ranging from 450° C. to 500° C., for at least 5 hours; then, after cooling to ambient temperature, a second calcination is conducted under the same conditions as the first.

The prior art is thus replete with references to the air or other oxidation of olefins, especially the oxidation of propylene to acrolein, utilizing catalysts comprising the oxides of cobalt, iron, bismuth and molybdenum. And a certain number of oxides of other metals have also been proposed as additives to, or adjuvants for, the base composition. It too is characteristics of the preparation of each of such catalysts that, in a first stage, ammonium heptamolybdate is reacted with the nitrates of iron, cobalt and bismuth.

During this reaction, ammonium nitrate is formed, which thermally decomposes at approximately 220° C. during a subsequent calcination.

It is trivially apparent, though, that the thermal decomposition of ammonium nitrate poses certain very serious practical problems. For example, it is very well known to the art that ammonium nitrate is an explosive compound; therefore, its handling on an industrial scale is quite dangerous.

In certain processes, in place of the nitrates, the chlorides of the metals destined for incorporation in the catalyst desired, are also used. Accordingly, ammonium chloride, NH4Cl, is then used, which during its thermal decomposition sublimes at about 340° C. and is deposited in the form of a white powder in the apparatus. The resulting fouling of the equipment is very obviously harmful to the process for the manufacture of the catalyst.

It should be emphasized that on an industrial level it is extremely difficult, if not impossible, to eliminate the simultaneous or conjoint presence of ammonium salts and nitrates, or ammonium salts and chlorides.

Hence, a great need exists in this art for a process enabling the preparation of catalysts based, in particular, on the oxides of molybdenum and/or tungsten, and predicated upon the reaction of at least one ammonium salt and at least one chloride and/or nitrate of the topic metals, wherein there is no danger during any subsequent calcination operations of the thermal decomposition of ammonium nitrate and/or the sublimation of ammonium chloride.

SUMMARY OF THE INVENTION

Accordingly, a major object of the present invention is the provision of an improved process for the preparation of the molybdenum and/or tungsten mixed oxide oxidation catalysts, and which improved process is conspicuously devoid of the parameters of ammonium nitrate thermal decomposition and ammonium chloride sublimation.

Briefly, the present invention features the preparation of catalysts comprising an active phase corresponding to the general formula:

$$A_a Mo_c W_d B_b O_x$$

wherein:

(i) A represents at least one metal selected from the group comprising cobalt, nickel, manganese and lead;

(ii) B represents at least one metal selected from the group comprising iron, bismuth, chromium and thallium;

(iii) a represents the sum of the indices assigned to each of the metals A, and is greater than 0 and less than or equal to approximately 12;

(iv) c and d are each greater than or equal to 0 and less than or equal to 12, their sum c+d being equal to approximately 12;

(v) b represents the sum of the indices assigned to each of the metals B, and is greater than 0 and less than or equal to approximately 1.5 [(c+d)−a]; and (vi) x satisfies the unfilled valences, and which process comprising, (i) in a first stage, admixing in aqueous phase salts of those metals destined for incorporation in the catalyst active phase, with the molybdenum and/or tungsten being in the form of an ammonium salt and at least one of the metals A and B being in the form of the nitrate or chloride, (ii) in a second stage, drying the paste which results, and, (iii) in a third stage, conducting at least one calcination upon the dry solids which result, optionally while deposited on a support, and said process being characterized in that, in said first stage, a first aqueous solution containing ammonium salts of molybdenum and tungsten is successively added in those amounts required to attain the values of c and d, with a second aqueous solution being added containing salts of the metals A and B in amounts required to attain the values of a and b, in that, to the mixture obtained, ammonia is then added thereto until a pH higher than the pH of the initial aqueous solution is obtained, and then in that the resulting solution is filtered to obtain said paste which is dried in step (ii).

DETAILED DESCRIPTION OF THE INVENTION

More particularly according to this invention, the subject process is bottomed on the phenomenon that when the first and the second aqueous solutions are intimately admixed, the pH which had been that of the first aqueous solution of the salts of molybdenum and/or tungsten decreases until a highly acid pH, between approximately 1 and approximately 2, results. This drop in pH, due to the presence of the nitrate(s) and/or chloride(s) in the second aqueous solution, is accompanied by a precipitation of solids based on the metals of the aforenoted group B. When the pH is raised by the addition of ammonia and, more particularly, when it is raised to a value greater than that of the first aqueous solution, the precipitation of solids based on the metals of group A is facilitated. Following completion of the ammonia addition and after filtering, a solid phase results which does not contain ammonium nitrate and/or ammonium chloride and which, after drying and calcining, yields the desired catalyst. The liquid phase is an aqueous solution containing basically the ammonium nitrate and/or ammonium chloride formed, and also containing trace amounts of those metals which become a part of the active phase of the desired catalyst.

Consistent herewith, it has been theorized that that solid which precipitated when the first and the second aqueous solutions are intimately admixed, consists essentially of molybdates of the metals of group B; the solid precipitating during the addition of ammonia consists essentially of molybdates of the metals of Group A.

As one particular ammonium salt of molybdenum, ammonium heptamolybdate is the preferred, and may be employed either in the form of crystalline ammonium heptamolybdate, or in the form of a mixture of ammonium molybdate and molybdic anhydride.

When the first aqueous solution is solely comprised of ammonium heptamolybdate, its pH is about 5.4. In order to effect precipitation of the metals of group A, it is necessary to increase this value by the addition of ammonia.

Representative of the envisaged ammonium salts of tungsten, ammonium para-tungstate is preferred.

When the first aqueous solution is exclusively comprised of ammonium para-tungstate, the pH to be exceeded, i.e., the pH of the aqueous solution, is approximately 5.8.

When the aqueous solution comprises a mixture of the two salts, i.e., of both ammonium para-tungstate and ammonium heptamolybdate, the pH will vary depending upon the respective proportions of each, between approximately 5.4 and approximately 5.8.

The final pH value, upon which the addition of ammonia is based, depends on the amount of the metals of group A to be precipitated.

It will be readily apparent to one skilled in this art, that from the two beginning aqueous solutions it is possible to obtain different catalyst compositions, depending upon whether the addition of ammonia is discontinued sooner or later. This invention thus provides a supplementary advantage by reason of the fact that it is possible to very accurately control the final composition of the catalyst.

According to a preferred embodiment of the invention, there are interreacted a first aqueous solution solely comprising ammonium heptamolybdate salt and a second aqueous solution containing as the metal A, cobalt, and as the metal B, iron and bismuth in amounts sufficient to provide a catalyst of the above formula wherein a ranges from 8 to about 10, c is equal to approximately 12, and b ranges from about 1 to about 4. In this embodiment, ammonia is added to the mixture until a pH of between approximately 6 and approximately 9 results.

Even more preferably according to the invention, there are interreacted these same two aqueous solutions of molybdenum and on the other hand, of iron, bismuth and cobalt, but in amounts sufficient to provide a catalyst of the above formula wherein a is equal to approximately 10, c is equal to approximately 12, and b is equal to 2.

In this latter embodiment, the ammonia is added to the resulting mixture to obtain a pH of about 6.5.

According to another embodiment of the invention, upon completion of the addition of ammonia and prior to filtration, the suspension obtained is heated to a temperature between approximately 20° C. and approximately 100° C. and this temperature is maintained for from about 1 hour to about 48 hours. This heat treatment effects completion of the precipitation of the metals of group A and of molybdenum and/or tungsten. During this optional phase of the process, the pH development, which may decline slightly, may be assisted.

It is clearly apparent that the higher the temperature, the shorter the time required for maintenance of the suspension at this temperature.

Preferably, the suspension is maintained for 4 hours at a temperature of 60° C.

The ammonia is immediately added by using, preferably, an aqueous solution containing from about 50 to about 250 g ammonia per liter of solution, and by adding this solution at a rate of from about 20 to about 200 g $NH_3$/h/liter of mixture.

Even more preferably, this operation is conducted using a solution containing 200 g ammonia/liter and at a rate of 60 g $NH_3$/h/liter of mixture.

As indicated hereinabove, the catalysts obtained according to the process of the invention are particularly useful for preparing acrolein via the air oxidation of propylene.

In order to further illustrate the present invention and the advantages thereof, the following specific examples are given, it being understood that same are intended only as illustrative and in nowise limitative:

EXAMPLE 1

Preparation of $Co_9Mo_{12}Fe_1Bi_1O_x$:

A first aqueous solution of ammonium heptamolybdate was prepared by dissolving 167.6 g $(NH_4)_6Mo_7O_{24}.4H_2O$ in 760 cm$^3$ $H_2O$ at ambient temperature; a second aqueous solution of nitrates was prepared by mixing at the ambient temperature the following three solutions:

(i) 38.4 g $Bi(NO_3)_3.5H_2O$ in 28.5 cm$^3$ $H_2O$ acidified with 4 cm$^3$ pure nitric acid;

(ii) 32.1 g $Fe(NO_3)_3.9H_2O$ in 25 cm$^3$ $H_2O$; and (iii) 230.2 g $Co(NO_3)_2.6H_2O$ in 150 cm$^3$ $H_2O$.

The second solution, that of the nitrates, was maintained under strong agitation at ambient temperature and said second nitrate solution was added to the heptamolybdate solution under strong agitation.

Upon completion of the addition of the nitrate solution the overall pH was 1.3. A precipitate based on bismuth and iron then developed.

Subsequently, a solution of $NH_4OH$ (d=0.926, 184 g $NH_3$/l) was added thereto at a rate of 5 cm$^3$/min. When the pH reached a value of 6.9, after 146 ml of $NH_4OH$ had been added over a period of 30 min, such addition was discontinued. Another precipitate, based on cobalt, developed. The resulting suspension was heated to a temperature of 60° C. and was maintained at such temperature for 4 hours. The suspension was then filtered. A precipitate was obtained, on the one hand, while on the other a filtrate was recovered, the analysis of which indicated the presence of 156 g $NH_4NO_3$, of 5.4 g Co expressed in metallic form and 2.6 g Mo, also expressed as the metal. The presence of iron or of bismuth was not detected in the filtrate. The precipitate was washed with one liter of $H_2O$ at ambient temperature. The filter cake was dried for 20 hours at 120° C., yielding 226 g solids, which were then calcined at 400° C. for 6 hours; a weight loss of 19.6 g resulted. This weight loss corresponded to the decomposable products present in the dried product, a portion of which being the ammonium nitrate not eliminated by the filtrate. The product obtained had the formula: $Co_{9.1}$, $Mo_{12}$, $Fe_{1.03}$, $Bi_{1.03}O_x$. The precipitation yield was 88.4% for the cobalt, 97% for the molybdenum and 100% for both the iron and bismuth. Subsequently, the solids may be ground, coated onto a support and calcined by methods per se known to this art.

EXAMPLES 2-4

Preparation of different catalysts by varying the pH with ammonia:

The procedure of Example 1 was repeated, with the same solutions of heptamolybdates and metals, but with varying of the amount of $NH_4OH$ added, and thus the final pH. The results of these examples are reported in the following Tables I and II.

EXAMPLES 5-12

Effect of heat treatment after the addition of $NH_4$ but prior to filtering:

The procedure of Example 1 was repeated, with the same solutions of ammonium heptamolybdate and the nitrates, but while conducting different heat treatments on the resultant suspension, 4 hours in duration and at different temperatures.

The results of such operation are reported in the following Tables III and IV. By way of comparison, these results are also reported for that instance (Example 9) wherein no heat treatment whatsoever was performed.

A second series of experiments was carried out while varying the time, but maintaining the temperature constant (80°). The results of these particular experiments are reported in Tables V and VI.

EXAMPLE 13

Preparation of catalyst having the formula $Co_{8.5}Mo_{12}Fe_1Bi_{0.5}O_x$:

A first aqueous solution of ammonium heptamolybdate was prepared by dissolving 167.6 g $(NH_4)_6 Mo_7O_{24}.4H_2O$ in 760 cm$^3$ $H_2O$ at ambient temperature.

A second aqueous solution of nitrates was prepared by mixing at ambient temperature the following three solutions:

(i) 230.2 g $Co(NO_3)_2.6H_2O$ in 100 cm$^3$ $H_2O$;

(ii) 16.05 g $Fe(NO_3)_2.9H_2O$ in 12.5 cm$^3$ $H_2O$; and (iii) 38.4 g $Bi(NO_3)_3.5H_2O$ in 28.5 cm$^3$ $H_2O$, acidified with 4 cm$^3$ pure nitric acid.

The two solutions were admixed as in Example 1. The pH dropped to 2.2; then 125 cm$^3$ $NH_4OH$ (d=0.926, 114 g/l in $NH_3$) were added at a rate of 5 cm$^3$/min. Such addition was discontinued when the pH attained a value of 7.

After drying at 120° C., the weight of the solids was 218 g.

The weight loss after calcining at 400° C. was 15.3 g.

The formula of the resultant product was:

$Co_{8.5}Mo_{12}Fe_{1.02}Bi_{0.50}O_x$.

The precipitation yield was 83% for the cobalt, 97.3% for the molybdenum and more than 99.9% for both the iron and bismuth.

EXAMPLE 14

Preparation of catalyst having the formula $Co_{9.4}Mo_{12}Fe_{0.5}Bi_{0.5}$:

The procedure of Example 1 was repeated, using the following solutions:
(i) 167.6 g $(NH_4)_6Mo_7O_{24}.4H_2O$ in 760 cm³ $H_2O$;
(ii) 230.2 g $Co(NO_3)_2.6H_2O$ in 100 cm³ $H_2O$;
(iii) 16.05 g $Fe(NO_3)_2.9H_2O$ in 12.5 cm³ $H_2O$; and
(iv) 19.2 g $Bi(NO_3)_3.5H_2O$ in 14.5 cm³ $H_2O$.

Upon admixture of the two solutions, the resultant pH dropped to 2.85.

Then, 120 cm³ $NH_4OH$ (d=0.926, 184 g/l in $NH_3$) were added thereto at a rate of 5 cm³/min, until a pH of 6.6 was obtained.

The operation was then continued to completion, exactly as in Example 1.

The filtrate contained 118 g $NH_4NO_3$; 4.2 g cobalt, 3.41 g molybdenum, and the content in iron and bismuth was less than 0.01 g.

The weight of the solids after drying at 120° C. was 232 g.

The weight loss after calcining at 400° C. is 37 g.

The product obtained had the formula:

$Co_{9.4}Mo_{12}Fe_{0.51}Bi_{0.51}$

The precipitation yield was 91% for the cobalt, 96.5% for the molybdenum and more than 99.9% for both the iron and bismuth.

EXAMPLE 15

Preparation of catalyst having the formula $Co_{9.8}Mo_{12}Fe_{1.2}Bi_{1.2}O_x$:

The procedure of Example 1 was repeated, using the following solutions:
(i) 167.6 g $(NH_4)_6Mo_7O_{24}.4H_2O$ in 760 cm³ $H_2O$;
(ii) 184.2 g $Co(NO_3)_2.6H_2O$ in 100 cm³ $H_2O$;
(iii) 32.1 g $Fe(NO_3)_2.9H_2O$ in 25 cm³ $H_2O$; and
(iv) 38.4 g $Bi(NO_3)_3.5H_2O$ in 28.5 cm³ $H_2O$, acidified with 4 ml pure nitric acid.

When the two aqueous solutions were admixed, the resultant pH dropped to 1.5.

Then, 200 ml $NH_4OH$ (d=0.926, 185 g/l in $NH_3$) were added thereto at a rate of 5 cm³/min, until a pH of 8 was obtained.

The operation was then continued to completion, exactly as in Example 1.

The filtrate contained 134 g $NH_4NO_3$, less than 0.02 g cobalt, 16.8 g molybdenum and less than 0.02 g of both bismuth and iron.

The weight of the solids after drying at 120° C. was 215 g.

The weight loss after calcination at 450° C. was 32.2 g.

The product obtained had the formula of:

$Co_{9.8}Mo_{12}Fe_{1.2}Bi_{1.2}O_x$

The precipitation yield was 99.9% for the cobalt, 80.5 for the molybdenum and more than 99.9% for both the iron and bismuth.

EXAMPLE 16

Preparation of $Co_5Ni_5Mo_{12}Fe_1Bi_1O_x$

A first aqueous solution of ammonium heptamolybdate was prepared by dissolving 83.3 g of $(NH_4)_6Mo_7O_{24}.4H_2O$ in 380 ml $H_2O$ at ambient temperature; a second aqueous solution of nitrates by mixing at the ambient temperature the following three solutions:
(i) 19.2 g $Bi(NO_3)_3.5H_2O$ in 14 cm³ $H_2O$ acidified with 2 cm³ pure nitric acid;
(ii) 16.05 g $Fe(NO_3)_3.9H_2O$ in 12.5 cm³ $H_2O$; and
(iii) 57.5 g $Ni(NO_3)_2.6H_2O$ and 57.5 g $Co(NO_3)_2.6H_2O$ in 100 cm³ $H_2O$.

The second solution, that of the nitrates, was maintained under strong agitation at ambient temperature and said second nitrate solution was added to the heptamolybdate solution under strong agitation.

Upon completion of the addition of the nitrate solution the overall pH was 1.75. A precipitate based on bismuth and iron then developed.

Subsequently, 75 cm³ of $NH_4OH$ (d=0.920) was added for 20 mn. The pH was 7. Another precipitate, based on cobalt and nickel, developed. The resulting suspension was heated to a temperature of 70° C. and was maintained at such temperature for 4 hours. The suspension was then filtered. A precipitate was obtained, on the one hand, while on the other a filtrate was recovered, the analysis of which indicated the presence of 70 g of $NH_4NO_3$, of 0.4 g Co expressed in metallic form 0.6 g Ni and 3.15 g Mo, also expressed as the metal. The presence of iron or of bismuth was not detected in the filtrate. The precipitate was washed with 500 cm³ $H_2O$ at ambient temperature. The filter cake was dried for 20 hours at 120° C. yielding 122 g solids, which were then calcined at 400° C. for 6 hours; a weight loss of 24 g resulted. This weight loss corresponded to the decomposables products present in the dried product.

The product obtained had the formula $Co_{5.2}Ni_{5.1}Mo_{12}Fe_{1.07}Bi_{1.07}O_x$.

The precipitation yield was 96.3% for the cobalt, 94.8% for the nickel, 93% for the molybdenum and 100% for both the iron and bismuth.

EXAMPLE 17

Preparation of $Co_5Mn_5Mo_{12}Fe_1Bi_1O_x$.

The procedure of Example 16 was repeated using 49.6 g $Mn(NO_3)_2.4H_2O$ instead of 57.5 $Ni(NO_3)_2.6H_2O$.

Upon admixture of the two solutions, the resultant pH dropped to 1.3.

The filtrate contained 78 g $NH_4NO_3$; 0.37 g cobalt; 0.12 g manganese and 3.15 g molybdenum.

The weight of the solids was 115 g.

The weight loss after calcining at 400° C. for 6 hours was 11 g.

The product obtained had the formula $Co_{5.2}Mn_{5.3}Mo_{12}Fe_{1.07}Bi_{1.07}O_x$ The precipitation yield was 96.8% fo cobalt, 98.8% for manganese, 93.1% for molybdenum and 100% for both the iron and bismuth.

EXAMPLE 18

Preparation of $Co_{10}Mo_{12}Fe_1Bi_1Cr_{0.5}O_x$.

The procedure of example 16 was repeated but with 7.9 g $Cr(NO_3)_3 9H_2O$ in 15 cm³ $H_2O$ and 115 g $Co(NO_3)_2.6 H_2O$ in 50 cm³ $H_2O$ without using nickel.

Upon admixture of the two solutions the pH dropped to 1.15.

After adding 75 cm³ $NH_4OH$ (d=0.920) for 50 mn, and pH reached 7.

The filtrate contained 80 g $NH_4NO_3$; 1.5 g cobalt; 1.15 g molybdenum; 0.012 g chromium. The presence of iron or of bismuth was not detected.

116 g of solids were obtained.

The weight loss after calcining at 400° C. for 6 hours was 10 g.

The product obtained had the formula $Co_{9.6}Mo_{12}Fe_1Bi_1Cr_{0.5}O_x$.

The precipitation yield was 93.5% for cobalt, 97.5% for molybdenum, 98.8% for chromium and 100% for both the iron and bismuth.

EXAMPLE 19

Preparation of $Co_{10}Mo_{12}Fe_1Bi_1Tl_{0.12}O_x$.

The procedure of example 18 was repeated but using 2.1 g $Tl NO_3$ Win 50 cm³ $H_2O$ with 1 cm³ $HNO_3$ instead of 7.9 g $Cr(NO_3)_3 9H_2O$ in 15 cm³ $H_2O$.

Upon admixture of the two solutions the Ph dropped to 1.7.

75 cm³ $NH_4OH$ (d=9.20) was added for 50 mn. The pH reached 7.

The filtrate contained 77 g $NH_4NO_3$; 1.67 g cobalt; 1 g molybdenum; 0.005 g thallium. The presence of iron or of bismuth was not detected.

119 g of solids were obtained.

The weight loss after calcining at 400° C. for 6 hours was 12 g.

The product obtained had the formula $Co_{9.5}Mo_{12}Fe_{1.02}Bi_{1.02}Tl_{0.2}O_x$ The precipitation yield was 12.8% for cobalt, 97.8% for molybdenum, 99.6% for thallium and 100% for both the iron and bismuth.

TABLE 1

| Examples | Quantity of $NH_4OH$ added (ml) (d = 0.926) | Value of pH | Catalyst obtained |
|---|---|---|---|
| 2 | 124 | 6.4 | $Co_{8.5}Mo_{12}Fe_1Bi_1$ |
| 3 | 163 | 7 | $Co_{9.6}Mo_{12}Fe_1Bi_1$ |
| 4 | 183 | 7.1 | $Co_{9.9}Mo_{12}Fe_8Bi_1$ |

TABLE II

| Example | Composition of the filtrate (g) | | | | Weight of solids after drying at 120° C. (g) | Weight loss after calcination at 400° C. (g) | Precipitation yield % | | | |
|---|---|---|---|---|---|---|---|---|---|---|
| | $NH_4NO_3$ | Co | Mo | Bi | Fe | | | Co | Mo | Bi | Fe |
| 2 | 164 | 8.4 | 2.6 | <0.01 | <0.01 | 215 | 11.4 | 82 | 97.2 | >99.9 | >99.9 |
| 3 | 158 | 3.6 | 3.6 | <0.01 | <0.01 | 227 | 17.7 | 92.3 | 96 | >99.9 | >99.9 |
| 4 | 153 | 3.6 | 3.6 | <0.01 | <0.01 | 233 | 22.6 | 95 | 96 | >99.9 | >99.9 |

TABLE III

| Example | T. °C. | Catalyst obtained | Composition of filtrate (g) | | | |
|---|---|---|---|---|---|---|
| | | | $NH_4NO_3$ | Co | Mo | Bi | Fe |
| 5 | 50 | $Co_{9.4}Mo_{12}Bi_{1.04}Fe_{1.04}$ | 155 | 4.6 | 3.6 | <0.01 | <0.01 |
| 6 | 60 | $Co_{9.36}Mo_{12}Bi_{1.02}Fe_{1.02}$ | 162 | 4 | 2.3 | <0.01 | <0.01 |
| 7 | 70 | $Co_{9.56}Mo_{12}Bi_{1.04}Fe_{1.04}$ | 159 | 3.8 | 3.6 | <0.01 | <0.01 |
| 8 | 80 | $Co_{9.51}Mo_{12}Bi_{1.04}Fe_{1.04}$ | 159 | 3.7 | 3.2 | <0.01 | <0.01 |
| 9 | — | $Co_{9.55}Mo_{12}Bi_{1.07}Fe_{1.07}$ | 160 | 5.1 | 6.2 | <0.01 | <0.01 |

TABLE IV

| Example | Weight of solids after drying at 120° C. (g) | Weight loss after calcination at 400° C. (g) | Precipitation yield (%) | | | |
|---|---|---|---|---|---|---|
| | | | Co | Mo | Bi | Fe |
| 5 | 227 | 21 | 90.1 | 96 | >99.9 | >99.9 |
| 6 | 221 | 14 | 91.4 | 91.4 | >99.9 | >99.9 |
| 7 | 226 | 17 | 91.9 | 96 | >99.9 | >99.9 |
| 8 | 228 | 16.5 | 92 | 96.5 | >99.9 | >99.9 |
| 9 | 216 | 15.8 | 89 | 93.2 | >99.9 | >99.9 |

TABLE V

| Example | Duration of heat treatment (h) | Catalyst obtained | Composition of filtrate (g) | | | |
|---|---|---|---|---|---|---|
| | | | $NH_4NO_3$ | Co | Mo | Bi | Fe |
| 10 | 1.30 | $Co_{9.31}Mo_{12}Bi_{1.04}Fe_{1.04}$ | 163 | 4.8 | 3.4 | <0.01 | <0.01 |
| 11 | 2 | $Co_{9.56}Mo_{12}Bi_{1.04}Fe_{1.04}$ | 162 | 4.3 | 3.3 | <0.01 | <0.01 |
| 12 | 4 | $Co_{9.51}Mo_{12}Bi_{1.04}Fe_{1.04}$ | 159 | 3.7 | 3.2 | <0.01 | <0.01 |

TABLE VI

| Example | Weight of solids after drying at 120° C. (g) | Weight loss after calcination at 400° C. (g) | Precipitation yield (%) | | | |
|---|---|---|---|---|---|---|
| | | | Co | Mo | Bi | Fe |
| 10 | 219 | 13.3 | 89.7 | 96.3 | >99.9 | >99.9 |
| 11 | 224 | 14 | 90.8 | 96.4 | >99.9 | >99.9 |
| 12 | 228 | 16.5 | 92 | 96.5 | >99.9 | >99.9 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of an active catalyst having the formula:

$$A_aMo_cW_dB_{b_1}Bi_{b_2}Fe_{b_3}O_x$$

wherein A is at least one of the metals cobalt, nickel, manganese and/or lead; B is chromium and/or thallium; a is the sum of each of the metals A and ranges from greater than zero to about 12; c and d each ranges from zero to 12, with their sum being about 12; $b_1$ is the sum of the metals B and can be zero or greater, $b_2$ and $b_3$ are greater than zero, and the sum of $b_1+b_2+b_3$ ranges from greater than zero to about 1.5 $[(c+d)-a]$; and x fulfills all unsatisfied valences; which process comprises (I) intimately admixing (i) a first aqueous solution comprising the ammonium salts of the molybdenum and/or tungsten with the pH of the solution being in the range of from about 5.4 to about 5.8, and with said ammonium salts being present therein in amounts such as to satisfy the formula parameters c and d, with (ii) a second aqueous solution comprising the salts of bismuth, iron, and A and/or B metals, at least one of said salts being either a nitrate or a chloride, and said salts being present therein in amounts such as to satisfy the formula parameters of a, $b_1$ $b_2$ and $b_3$ until a first solids fraction precipitates therefrom, (II) thereafter basicifying the resulting suspension with ammonia to a pH value in excess of the pH of said first aqueous solution, until a second solids fraction precipitates therefrom; (III) recovering said first and said second solids fractions via filtration, and drying the same; and (IV) thence calcining said dried solids fractions.

2. The process as defined by claim 1, said first aqueous solution comprising only ammonium heptamolybdate salt.

3. The process as defined by claim 1, said first aqueous solution comprising only ammonium para-tungstate salt.

4. The process as defined by claim 1, said first aqueous solution comprising a mixture of ammonium heptamolybdate and ammonium para-tungstate salts.

5. The process as defined by claim 1 or 2, said suspension being basicified to a pH in excess of 5.4.

6. The process as defined by claim 1 or 3, said suspension being basicified to a pH in excess of 5.8.

7. The process as defined by claim 4, said suspension being basicified to a pH in excess of 5.4.

8. The process as defined by claim 1, said first aqueous solution comprising ammonium heptamolybdate salt, said second aqueous solution comprising the metals cobalt, iron and bismuth, in amounts such that a ranges from about 8 to about 10, c is about 12, and $b_1+b_2+b_3$ ranges from about 1 to about 4, and said suspension being basicified to a pH ranging from about 6 to about 9.

9. The process as defined by claim 8, wherein a is about 10 and $b_1+b_2+b_3$ is 2, and said suspension being basicified to a pH of about 6.5.

10. The process as defined by claim 1, further comprising heating the suspension resulting from the step (II) at a temperature ranging from about 20° C. to about 100° C., for from about 1 to about 48 hours, prior to conducting the step (III).

11. The process as defined by claim 10, said suspension being heated to about 60° C. for about 4 hours.

12. The process as defined by claim 1, the step (II) comprising basicifying with an aqueous solution containing from about 50 to about 250 grams of ammonia per liter of solution, and said basicification comprising addition of said solution to said suspension at a rate of from about 20 to about 200 g $NH_3$/hour/liter thereof.

13. The process as defined by claim 12, said aqueous solution containing about 200 grams of ammonia per liter of solution, and said rate of addition being about 60 g $NH_3$/hour/liter of suspension.

14. The process as defined by claim 1, said calcination (IV) being effected with said solids fractions deposited upon catalyst support.

15. The process as defined by claim 1, said second aqueous solution comprising the metals cobalt, lead, iron and bismuth.

* * * * *